US011726060B2

United States Patent
Calvo et al.

(10) Patent No.: US 11,726,060 B2
(45) Date of Patent: Aug. 15, 2023

(54) FLAME IONISATION DETECTOR AND METHOD FOR THE ANALYSIS OF AN OXYGEN-CONTAINING MEASURING GAS

(71) Applicant: Siemens Aktiengesellschaft, Munich (DE)

(72) Inventors: Ricardo Calvo, Karlsruhe (DE); Hans-Günther Kleih, Bruchsal (DE); Josef Richter, Karlsruhe (DE); Andreas Sutter, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 156 days.

(21) Appl. No.: 17/264,681

(22) PCT Filed: Jul. 22, 2019

(86) PCT No.: PCT/EP2019/069654
§ 371 (c)(1),
(2) Date: Jan. 29, 2021

(87) PCT Pub. No.: WO2020/025380
PCT Pub. Date: Feb. 6, 2020

(65) Prior Publication Data
US 2021/0302370 A1      Sep. 30, 2021

(30) Foreign Application Priority Data

Jul. 31, 2018   (EP) .................................... 18186619
Jul. 10, 2019   (DE) ..................... 10 2019 210 208.5

(51) Int. Cl.
*G01N 27/626*      (2021.01)
(52) U.S. Cl.
CPC ................................ *G01N 27/626* (2013.01)

(58) Field of Classification Search
CPC ........ G01N 27/626; F23N 5/242; F23N 5/123
(Continued)

(56) References Cited

U.S. PATENT DOCUMENTS 3,984,205 A * 10/1976 Karas .................... G01N 27/626
                                                          422/54
6,238,622 B1 * 5/2001 Salimian ................ G01N 30/68
                                                         436/154
(Continued)

FOREIGN PATENT DOCUMENTS

CN           2524244 Y        12/2002
CN           1434293 A         8/2003
(Continued)

OTHER PUBLICATIONS

PCT International Search Report and Written Opinion of International Searching Authority dated Oct. 17, 2019 corresponding to PCT International Application No. PCT/EP2019/069654 filed Jul. 22, 2019.

*Primary Examiner* — Giovanni Astacio-Oquendo
(74) *Attorney, Agent, or Firm* — Henry M. Feiereisen LLC

(57) ABSTRACT

A flame ionization detector includes a burner to combust an oxygen-containing sample gas in a gas flame in the presence of air and while supplying a hydrogen-containing combustion gas. A measurement device measures an ion current from the gas flame to an electrode, and a temperature sensor measures a temperature of the gas flame. An evaluation device evaluates the measured ion current and compensates during evaluation of the measured ion current for a cross-sensitivity of the ion current to oxygen in the sample gas using the measured temperature of the gas flame.

8 Claims, 1 Drawing Sheet

(58) Field of Classification Search
USPC ........................................ 324/468, 464, 459
See application file for complete search history.

(56) References Cited

U.S. PATENT DOCUMENTS

| | | | |
|---|---|---|---|
| 7,704,748 | B2 | 4/2010 | Schaeffer et al. |
| 8,587,319 | B1 | 11/2013 | Bolinger et al. |
| 10,955,490 | B2 * | 3/2021 | Kaufmann ............... H01H 9/54 |
| 2003/0085714 | A1 | 5/2003 | Keyes et al. |
| 2003/0127325 | A1 | 7/2003 | Khesin et al. |
| 2006/0266045 | A1 * | 11/2006 | Bollhalder .............. F23N 5/242 |
| | | | 60/725 |
| 2008/0213908 | A1 * | 9/2008 | Thurbide ............... G01N 30/68 |
| | | | 436/103 |
| 2011/0018544 | A1 * | 1/2011 | Bertelli .................. F23N 5/242 |
| | | | 324/459 |
| 2014/0287518 | A1 | 9/2014 | Depoutot et al. |
| 2015/0025761 | A1 * | 1/2015 | Kernebeck ............. G01B 7/003 |
| | | | 324/207.11 |
| 2017/0168015 | A1 | 6/2017 | Lippert-Gellissen et al. |
| 2017/0296056 | A1 * | 10/2017 | Hresko ................ A61B 5/0015 |
| 2020/0001048 | A1 * | 1/2020 | Oren ....................... G06T 5/002 |

FOREIGN PATENT DOCUMENTS

| | | |
|---|---|---|
| CN | 105067730 A | 11/2015 |
| CN | 106645584 A | 5/2017 |
| DE | 71 07 607 U | 3/1971 |
| DE | 203 20 366 U1 | 7/2004 |
| DE | 10 2013 205 139 B3 | 7/2014 |
| DE | 10 2015 121 534 A1 | 6/2017 |
| EP | 2447716 A1 | 5/2012 |
| JP | H05119006 A | 5/1993 |

\* cited by examiner

FLAME IONISATION DETECTOR AND METHOD FOR THE ANALYSIS OF AN OXYGEN-CONTAINING MEASURING GAS

CROSS-REFERENCES TO RELATED APPLICATIONS

This application is the U.S. National Stage of International Application No. PCT/EP2019/069654, filed Jul. 22, 2019, which designated the United States and has been published as International Publication No. WO 2020/025380 A1 and which claims the priorities of European Patent Application, Serial No. 18186619.5, filed Jul. 31, 2018 and German Patent Application, Serial No. 10 2019 210 208.5, filed Jul. 10, 2019, pursuant to 35 U.S.C. 119(a)-(d).

BACKGROUND OF THE INVENTION

The invention relates to a flame ionization detector and to a method for analyzing an oxygen-containing sample gas.

Flame ionization detectors (FIDs) serve to measure and monitor organic compounds such as hydrocarbons in gases, wherein carbon-containing molecules can be ionized in a gas flame and verified by measuring an electrical current. To this end, the hydrocarbons contained in the sample gas are combusted in a burner in the presence of air and while supplying hydrogen. During the combustion, the organically bound hydrocarbon content is ionized. By way of an electrical field generated between two electrodes, the ions are converted into an ion current, which is measured and evaluated in an evaluation device to determine the overall hydrocarbon concentration of the sample gas. By means of a temperature sensor, it is possible to detect whether the gas flame is burning or is extinguished.

It is known from DE 7107607 U or U.S. Pat. No. 7,704,748 B2 to compensate for the cross-sensitivity of flame ionization detectors to oxygen by using a hydrogen-helium mixture or a hydrogen-nitrogen mixture as combustion gas instead of pure hydrogen, for example. Since a continuous operation of flame ionization detectors with such a combustion gas mixture is comparatively expensive, a needle valve or capillary arrangement on the burner is proposed in DE 7107607 U in order to avoid the oxygen cross-sensitivity, by way of which a particular air current is supplied to the burner tip from the inside.

In order to solve the same problem, specific burner nozzles are known from DE 203 20 366 U1 or DE 10 2015 121 534 A1, in which a plurality of nozzle openings are provided for the formation of a plurality of flames, or combustion air reaches the gas mixture consisting of combustion gas and sample gas through a recess in the burner nozzle before the flame.

It is known from US 2003/0085714 A1 or U.S. Pat. No. 8,587,319 B1 to measure the temperature in a flame ionization detector in a region above the flame, and on the basis of the measured temperature to regulate the gas inflows (sample gas, combustion gas, combustion air) to the flame ionization detector, in order to keep its operating point stable. The problem mentioned above of the cross-sensitivity of flame ionization detectors to oxygen is not addressed or does not occur when, as known from US 200310085714 A1, the flame ionization detector is a constituent part of a process gas chromatography unit and obtains the components of the gas to be measured in a temporally separated manner.

It is known from DE 10 2013 205 139 B3 to combine the measuring principles of flame ionization detection and flame temperature analysis (FTA) with one another in a flame ionization detector, and to this end to measure the temperature of the flame. Through the evaluation of the measured ion current, it is ensured that a rapid response time is available. On the other hand, the evaluation of the flame temperature ensures a precise measurement. From the two measurements, an evaluation unit determines an output value as a measure for the concentration of flammable substances in the sample gas. It is not disclosed, how the two individual results from the flame ionization detection and the flame temperature analysis are linked to one another to form the one output value. The problem of the cross-sensitivity of flame ionization detectors to oxygen is also not addressed here.

Finally, it is known from JP H05 119006 A to measure the oxygen content in the sample gas by means of a separate oxygen meter, and thereby to compensate for the oxygen cross-sensitivity of the flame ionization detector.

The invention is based on the object of reducing the cross-sensitivity of flame ionization detectors to oxygen, without an oxygen meter, specific combustion gas mixtures or specific burner nozzles being required for this purpose.

SUMMARY OF THE INVENTION

According to the invention, the object is achieved by a flame ionization detector as set forth hereinafter, and by a method as set forth hereinafter.

Advantageous developments of the inventive flame ionization detector and the method emerge from the subclaims.

The subject matter of the invention is therefore a flame ionization detector, with a burner, in order to combust an oxygen-containing sample gas in a gas flame in the presence of air and while supplying a hydrogen-containing combustion gas, with a measurement device, in order to measure an ion current from the gas flame to an electrode, with an evaluation device evaluating the measured ion current and with a temperature sensor measuring the temperature of the gas flame, wherein the evaluation device is embodied, during the evaluation of the measured ion current, to compensate for the cross-sensitivity thereof to the oxygen in the sample gas using the measured temperature.

The subject matter of the invention is furthermore a method for analyzing an oxygen-containing sample gas on the basis of flame ionization, in which the sample gas is combusted in a gas flame in the presence of air and while supplying a hydrogen-containing combustion gas, and an ion current from the gas flame to an electrode is measured and evaluated, wherein the temperature of the gas flame is measured and the cross-sensitivity of the evaluation of the measured ion current to the oxygen in the sample gas is compensated using the measured temperature.

The invention is based on the observation that the temperature of the gas flame is barely dependent upon the hydrocarbon content in the sample gas in a measurable manner, but it does depend upon the oxygen content thereof. The invention takes advantage of this observation by compensating for the cross-sensitivity of the flame ionization detector to the oxygen content of the sample gas on the basis of the measured flame temperature. Specific and expensive combustion gas mixtures are no longer necessary, and also no specifically constructed burner nozzles are required.

As the flame temperature only changes slightly as oxygen content varies, the inventive compensation of the inventive oxygen cross-sensitivity can be distorted by fluctuations or long-term changes in the gas inflows (sample gas, combustion gas, combustion air). In order to prevent this, the pressures of the supplied gases can be regulated to a constant absolute pressure. When using relative pressure regulators, the regulation takes place in relation to the atmospheric pressure (ambient pressure), but this may change. In this case, it is advantageously possible for the ambient pressure to be measured, in order thereby to correct the measured values of the flame temperature used for the compensation of the oxygen cross-sensitivity.

BRIEF DESCRIPTION OF THE DRAWING

The invention is described in more detail in the following by way of example on the basis of the drawings, in which, shown in detail.

DETAILED DESCRIPTION OF PREFERRED EMBODIMENTS

Figure 1:
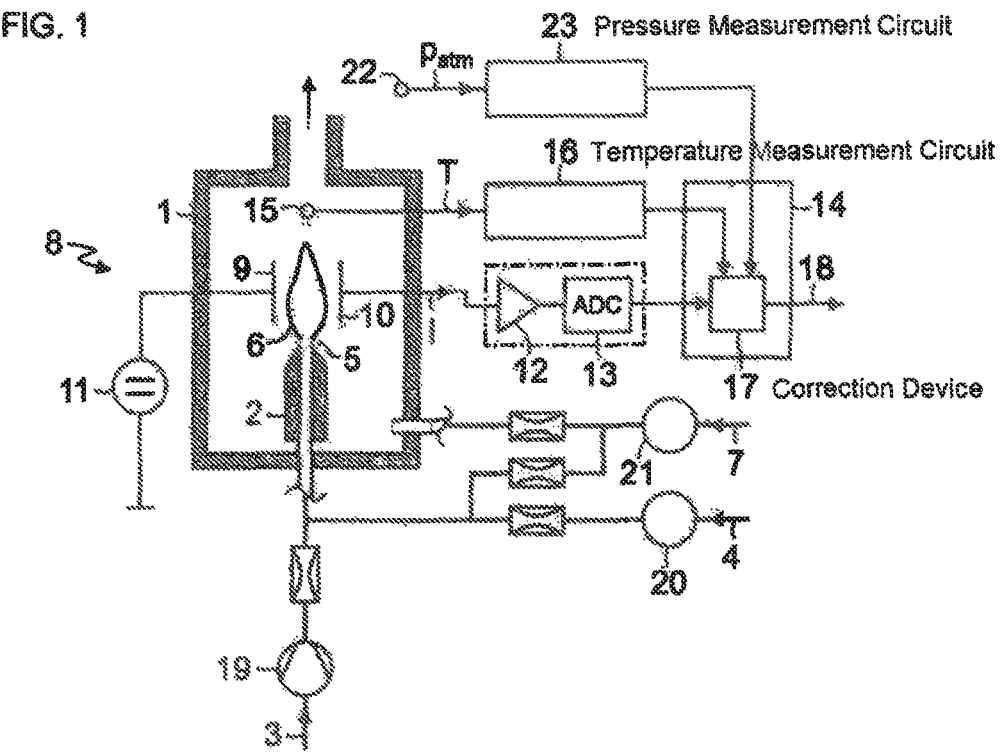
FIG. 1 shows a flame ionization detector.

FIG. 1 shows a simplified schematic representation of a flame ionization detector with a combustion chamber 1 and a burner (burner nozzle) 2 arranged in or protruding into said combustion chamber 1. The burner 2 is supplied with an oxygen-containing sample gas 3 and a hydrogen-containing combustion gas 4, preferably pure hydrogen, on the input side, these being mixed before or in the burner 2 and combusted in a flame 6 at an output-side outlet 5 of the burner 2. In addition, oxygen-containing combustion air 7, preferably purified hydrocarbon-free ambient air, with a constant approx. 21 percent by volume, is conducted into the combustion chamber 2.

During the combustion of the sample gas 3, the organically bound hydrocarbon content is ionized. In order to measure this hydrocarbon content, a measurement device 8 is provided with two electrodes 9, 10, between which the gas flame 6 burns. As an alternative to the example shown, one of the electrodes may be formed by the burner 2 and the other electrode may be arranged above the flame 6. By means of a voltage source 11, an electrical field is generated between the electrodes 9, 10, on the basis of which the ions flow out of the gas flame 6 to one of the electrodes 9, 10 in an ion current I. The ion current I is measured by means of a highly sensitive amplifier 12, digitized (ADC 13) and evaluated in an evaluation device 14 to determine the overall hydrocarbon concentration in the sample gas 3.

Arranged in or immediately above the gas flame 6 is a temperature sensor 15, e.g. a thermistor or thermocouple, which captures the flame temperature T and supplies it to the evaluation device 14 via a temperature measurement circuit 16.

The flame ionization detector has a cross-sensitivity to the oxygen in the sample gas 3, because the measured ion current I is not only dependent upon the hydrocarbon content of the sample gas 3, but also upon the oxygen content thereof.

Figure 2:
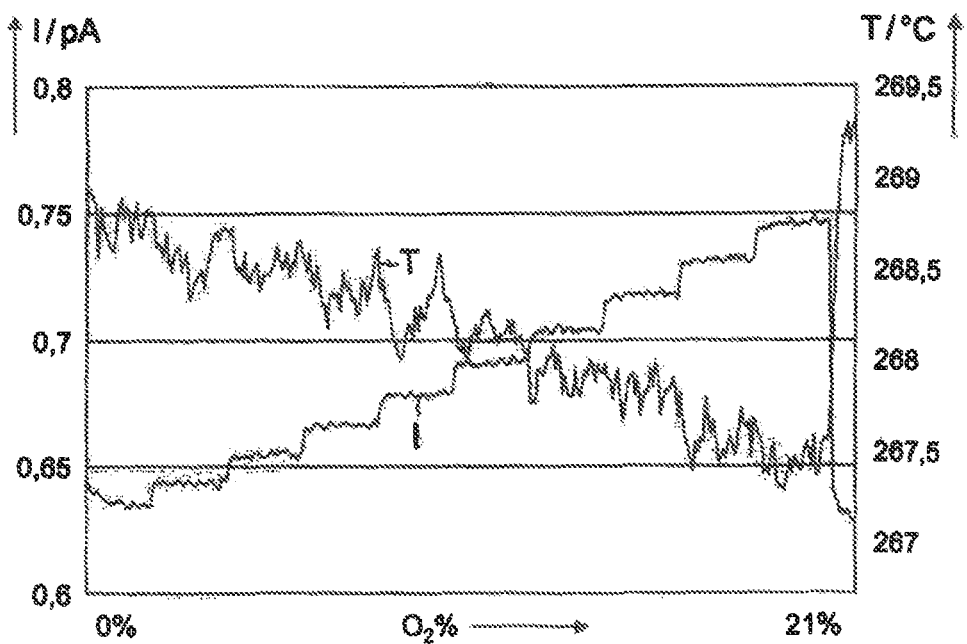
FIG. 2 shows an example of the dependency of the ion current and the flame temperature upon the oxygen content of a zero gas.

By way of example, FIG. 2 shows the dependency of the measured ion current I and the flame temperature T upon the oxygen content $O_2$% of a hydrocarbon-free zero gas, wherein the oxygen content $O_2$% here is increased in ten stages from left to right from 0% to 21%. As the oxygen content $O_2$% increases, the flame temperature T decreases, whereas the ion current I rises.

In the case of a hydrocarbon-containing sample gas 3, the ion current I and the flame temperature T decrease as the oxygen content $O_2$% of the sample gas 3 increases. This means that the FID measurement signal indicating the overall hydrocarbon concentration of the sample gas 3 is too low in the case of an oxygen content $O_2$% which is higher compared to the oxygen content during calibration, and is too high in the case of an oxygen content $O_2$% which is lower. Furthermore, however, it has been possible to establish that a change in the hydrocarbon content of the sample gas 3 has no or only a negligible influence on the flame temperature T. The flame temperature T therefore enables an indirect measurement of the oxygen content $O_2$% and thus a correction of the FID measurement signal. If the flame temperature T is therefore lower during measurement operation than during calibration, then the overall hydrocarbon concentration of the sample gas 3 ascertained from the ion current I is corrected upwards, and downwards in the reverse case.

The evaluation device 14 therefore contains a correction device 17, in which, during the evaluation of the measured ion current I, the cross-sensitivity thereof to the oxygen in the sample gas 3 is compensated using the measured flame temperature T. The correspondingly corrected evaluation result from the measured ion current I is output as a result 18 of the determination of the overall hydrocarbon concentration of the sample gas 3. Instead of a hydrogen/helium mixture, which is comparatively expensive, it is therefore possible to use pure hydrogen as combustion gas 4.

The inflows of the sample gas 3, combustion gas 4 and combustion air 7 are kept constant with the aid of a system consisting of a sample gas pump 19, pressure regulators 20, 21 and capillaries. The pressure regulators 20, 21 may involve absolute pressure regulators or relative pressure regulators. In the case of the latter, the regulation takes place in relation to the ambient pressure, meaning that a volumetric flow rate is produced which is independent of the ambient pressure. The mass flow, however, is dependent upon the gas density and thus upon the ambient pressure, wherein in the event of a decrease in the ambient pressure, the mass flows of the gases also decrease, and the flame temperature thus also decreases. An air pressure sensor 22 captures the ambient pressure $p_{atm}$ and supplies this to the evaluation device 14 via a pressure measurement circuit 23. In the correction device 17, the measured flame temperature T is corrected using the measured ambient pressure $p_{atm}$. If the ambient pressure $p_{atm}$ measured in measurement operation is therefore lower than during calibration, then the value of the measured flame temperature T used for the correction of the FID measurement signal is corrected upwards, and downwards in the reverse case.

What is claimed is:

1. A flame ionization detector, comprising:
   a burner combusting an oxygen-containing sample gas in a gas flame in the presence of air and while supplying a hydrogen-containing combustion gas;
   a measurement device configured to measure an ion current from the gas flame to an electrode;
   a temperature sensor configured to measure a temperature of the gas flame; and
   an evaluation device configured to evaluate the measured ion current and to compensate during evaluation of the measured ion current for a cross-sensitivity of the ion current to oxygen in the sample gas using the measured temperature of the gas flame.

2. The flame ionization detector of claim 1, further comprising absolute pressure regulators configured to regulate a supply of the hydrogen-containing combustion gas and the air, respectively.

3. The flame ionization detector of claim 1, further comprising:
relative pressure regulators configured to control a supply of the hydrogen-containing combustion gas and the air; and
an air pressure sensor configured to measure an ambient pressure,
wherein the evaluation device is configured to correct the measured temperature of the gas flame using the measured ambient pressure.

4. The flame ionization detector of claim 1, further comprising a sample gas pump configured to regulate a supply of the sample gas.

5. A method for analyzing an oxygen-containing sample gas based on flame ionization, said method comprising:
combusting with a burner the oxygen-containing sample gas in a gas flame in the presence of air and while supplying a hydrogen-containing combustion gas;
measuring with a measurement device an ion current from the gas flame to an electrode;
measuring with a temperature sensor a temperature of the gas flame;
evaluating the ion current with an evaluation device; and
compensating with the evaluation device during evaluation of the measured ion current for a cross-sensitivity of the ion current to oxygen in the sample gas using the measured temperature of the gas flame.

6. The method of claim 5, wherein the hydrogen-containing combustion gas is pure hydrogen.

7. The method of claim 5, further comprising regulating with absolute pressure regulators a pressure of the hydrogen-containing combustion gas, the air and the sample gas to a constant absolute pressure.

8. The method of claim 7, further comprising:
measuring an ambient pressure with an air pressure sensor;
regulating with relative pressure regulators the pressure of the hydrogen-containing combustion gas, the air and the sample gas to a constant relative pressure in relation to the ambient pressure; and
correcting with the evaluation device the measured temperature of the gas flame using the measured ambient pressure.

* * * * *